United States Patent [19]
Stearns et al.

[11] Patent Number: 5,774,676
[45] Date of Patent: *Jun. 30, 1998

[54] METHOD AND APPARATUS FOR DECOMPRESSION OF MPEG COMPRESSED DATA IN A COMPUTER SYSTEM

[75] Inventors: Charles C. Stearns, San Jose; Stephanie W. Ti, Milpitas, both of Calif.

[73] Assignee: S3, Incorporated, Santa Clara, Calif.

[ * ] Notice: The term of this patent shall not extend beyond the expiration date of Pat. No. 5,774,676.

[21] Appl. No.: 538,887

[22] Filed: Oct. 3, 1995

[51] Int. Cl.⁶ .................................................. G06F 17/00
[52] U.S. Cl. ........................................................ 395/200.77
[58] Field of Search ........................... 364/514 R, 514 A, 364/715.02; 395/200.77, 412, 439; 382/233, 246, 234

[56] References Cited

U.S. PATENT DOCUMENTS

| | | | |
|---|---|---|---|
| 5,212,742 | 5/1993 | Normille et al. | 382/233 |
| 5,335,321 | 8/1994 | Harney et al. | 395/162 |
| 5,379,356 | 1/1995 | Purcell et al. | 382/233 |
| 5,394,534 | 2/1995 | Kulakowski et al. | 395/425 |
| 5,493,339 | 2/1996 | Birch et al. | 348/461 |
| 5,557,538 | 9/1996 | Retter et al. | 364/514 R |
| 5,642,139 | 6/1997 | Eglit et al. | 382/233 |

FOREIGN PATENT DOCUMENTS

| | | |
|---|---|---|
| 0 503 956 | 9/1992 | European Pat. Off. . |
| 95 32578 | 11/1995 | WIPO . |

OTHER PUBLICATIONS

Foley, P.: "The MPACT Media Processor Redefines the Multimedia PC", IEEE Comput. Soc. Press, USA, pp. 311–318, XP000577494, proceedings of Compcon '96.

Gruger, K., et al.: MPEG–1 Low Cost Encoder Solution, Proceedings of the SPIE—The International Society for Optical Engineering, 1995, USA, pp. 41–51, XP000577418, Advanced Image and Video Communications and Storage Technologies, Amsterdam, Netherlands, 20–23 Mar. 1995.

*Primary Examiner*—Ellis B. Ramirez
*Attorney, Agent, or Firm*—Skjerven, Morrill, MacPherson, Franklin & Friel LLP; Norman R. Klivans

[57] ABSTRACT

MPEG compressed data is decompressed in a computer system by sharing computational decompression tasks between the computer system host microprocessor, the graphics accelerator, and a dedicated MPEG processor in order to make best use of resources in the computer system. Thus the dedicated MPEG processor is of minimum capability and hence advantageously minimum cost. The host microprocessor is used to decompress the MPEG upper data layers. The more powerful the host microprocessor, the more upper data layers it decompresses. The remainder of the decompression (lower data layers) is performed by the MPEG dedicated processor and/or the graphics accelerator.

26 Claims, 14 Drawing Sheets

Microfiche Appendix Included
(1 Microfiche, 51 Pages)

```
 0    1    2    3    4    5    6    7
 8    9   10   11   12   13   14   15
16   17   18   19   20   21   22   23
24   25   26   27   28   29   30   31
32   33   34   35   36   37   38   39
40   41   42   43   44   45   46   47
48   49   50   51   52   53   54   55
56   57   58   59   60   61   62   63
                  ↓
 0    1    5    6   14   15   27   28
 2    4    7   13   16   26   29   42
 3    8   12   17   25   30   41   43
 9   11   18   24   31   40   44   53
10   19   23   32   39   45   52   54
20   22   33   38   46   51   55   60
21   34   37   47   50   56   59   61
35   36   48   49   57   58   62   63
```

| 1 begin | | | | |
|---|---|---|---|---|
| | | end 1 | 2 begin | |
| end 2 | 3 begin | | end 3 | 4 begin |
| | | | | |
| | | | | |
| | | | end 4 | 5 begin |
| | | | | end 5 |
| 6 begin | | | | |
| | | | end 6 | 7 begin |
| end 7 | 8 | 8 | 9 begin | end 9 | 10 begin |
| | | | | |
| | | | | end 10 |

METHOD AND APPARATUS FOR DECOMPRESSION OF MPEG COMPRESSED DATA IN A COMPUTER SYSTEM

CROSS-REFERENCE TO RELATED APPLICATIONS

This application is related to copending and commonly owned U.S. patent applications Ser. No. 08/489,488, filed Jun. 12, 1995, entitled "Decompression of MPEG Compressed Data in a Computer System", Charles C. Stearns, Ser. No. 08/490,322, filed Jun. 12, 1995, entitled "Video Decoder Engine", Soma Bhattacharjee et al., Ser. No. 08/489,489, filed Jun. 12, 1995, entitled "Audio Decoder Engine," Charlene S. Ku et al., and Ser. No. 08/508,636, filed Jul. 28, 1995, entitled "Frame Reconstruction For Video Data Compression", Stephanie W. Ti et al., all incorporated by reference.

MICROFICHE APPENDIX

A microfiche appendix including 1 fiche and a total of 51 frames is a part of this disclosure.

BACKGROUND OF THE INVENTION

1. Field of the Invention

This invention relates to data decompression, and specifically to decompression of MPEG compressed data in a computer system.

2. Description of Prior Art

The well-known MPEG (Motion Picture Experts Group) data standard defines two compression/decompression processes, called conventionally MPEG 1 and MPEG 2. For purposes of this disclosure, MPEG 1 and MPEG 2 are similar. The MPEG 1 standard is described in the ISO publication No. ISO/IEC 11172: 1993(E), "Coding for moving pictures and associated audio . . . ", and the MPEG 2 standard is defined in the ISO publication No. ISO/IEC 13818-2, both incorporated by reference herein in their entirety. The MPEG standard defines the format of compressed audio and video data especially adapted for e.g., motion pictures or other live video. MPEG compression is also suitable for other types of data including still pictures, text, etc. The MPEG standard in brief (the above-mentioned publications are more complete) defines the data format structure shown in FIG. 1 for CD-ROM content. The top required layer is the MPEG system layer having underneath it, in parallel, the video layer and audio layer. The MPEG system layer contains control data describing the video and audio layers.

Above (wrapped around) the MPEG system layer is another (optional) layer called the White book ("video CD") or the Green book ("CDI") that includes more information about the particular program (movie). For instance, the book layer could include Karaoke type information, high resolution still images, or other data about how the program content should appear on the screen. The video layer includes sequence (video), picture (frame), slice (horizontal portions of a frame), macroblock (64 pixels by 64 pixels) and block (8 pixels by 8 pixels) layers, the format of each of which is described in detail by the MPEG standard.

There are commercially available integrated circuits (chips) for MPEG decompression. Examples are those sold by C-Cube Microsystems and called the CL-450 and CL-480 products. In these products the MPEG audio and visual decompression (of all layers) is accomplished completely in dedicated circuitry in an internally programmable microcontroller. The book layer and entire MPEG system layer parsed to the last pixel of the compressed data are decompressed using the C-Cube Microsystems products. Thus these chips accomplish the entire decompression on their own, because these chips are intended for use in consumer type devices (not computers). Thus these chips include a system memory, a CD-ROM controller and any necessary processing power to perform complete MPEG decompression.

Similar products are commercially available from a variety of companies. While these products perform the decompression task fully in a functional manner, they are relatively expensive due to their inclusion of the large number of functions dedicated to MPEG decompression. Thus their commercial success has been limited by high cost.

SUMMARY

It has been recognized by the present inventors that in a computer (i.e., personal computer or workstation) environment, that already available elements are capable of performing a large portion of the MPEG decompression task. Thus in this environment use of a dedicated fully functional MPEG decompression integrated circuit is not necessary, and instead a substantial portion of the decompression can be off-loaded onto other conventional computer system elements. Thus only a relatively small portion of the actual data decompression must be performed by dedicated circuitry, if any. In accordance with the invention, the MPEG decompression task is allocated amongst various already existing elements of a typical computer system and if necessary, depending on the capabilities of these other elements, an additional relatively small (hence inexpensive) dedicated MPEG decompression circuit is provided.

Thus advantageously in accordance with the present invention the MPEG (compressed using layers) content of data is decompressed in a computer system typically already including a microprocessor, graphics accelerator, frame buffer, peripheral bus and system memory. A shared computational approach between the microprocessor (host processor), graphics accelerator and a dedicated device makes best use of the computer system existing resources. This is a significant advantage over the prior art where the MPEG decompression is performed entirely by a dedicated processor. Thus in accordance with the invention by partitioning of the decompression process amongst the major available elements in a personal computer, decompression is provided inexpensively.

Further, in accordance with the present invention frame reconstruction is carried out by logic circuitry including three main elements which are a horizontal interpolation element, a vertical interpolation element, and a post processing element. The horizontal interpolation element interpolates two adjacent (horizontally adjacent) pixels in one particular MPEG block of pixels. That is, this is a digital averaging filter. The output of the horizontal interpolation element is then provided to the vertical interpolation element which similarly interpolates (averages) two pixels which are vertically adjacent in that same MPEG block. (In another embodiment, the vertical interpolation is before the horizontal interpolation.) In the post-processing element (which is a selector) the vertically and horizontally interpolated data is processed in conjunction with externally provided IDCT MPEG decompressed data to generate the final output data.

BRIEF DESCRIPTION OF THE DRAWINGS

Identical reference numbers in different figures refer to similar or identical structures.

DETAILED DESCRIPTION OF THE PREFERRED EMBODIMENTS

As well known, each element in a computer system (e.g., personal computer or workstation) has particular strength and weaknesses. For instance, the microprocessor (host processor) is typically the single most capable and expensive circuit in a computer system. It is intended to execute a single instruction stream with control flow and conditional branching in minimum time. Due to its internal arithmetic units, the microprocessor has high capability for data parsing and data dependent program execution. However, the microprocessor is less capable at transferring large quantities of data, especially data originating from peripheral elements of the computer.

The core logic chip set of a computer interfaces the microprocessor to the peripherals, manages the memory subsystem, arbitrates usage and maintains coherency. However, it has no computational capabilities of its own. The graphics subsystem manages and generates the data which is local to the frame buffer for storing video and graphics data. The graphics subsystem has a capability to transfer large amounts of data but is not optimized for control flow conditional branching operation.

The present inventors have recognized that in MPEG compressed content (video data) having the various layers, each layer has certain characteristics requiring particular hardware (circuit) properties to parse that level of information. For example, it has been determined that in the book and system layers of MPEG, which are the top most layers in the video data stream, the information resembles a program data/code data stream and in fact may contain executable code (software). The information at that level is thus like a program code stream containing control flow information, variable assignments and data structures. Hence it has been recognized that the microprocessor is suited for parsing such information. (The term "parsing" herein indicates the steps necessary to decompress data each layer of the type defined by the MPEG standard.)

Figure 1:
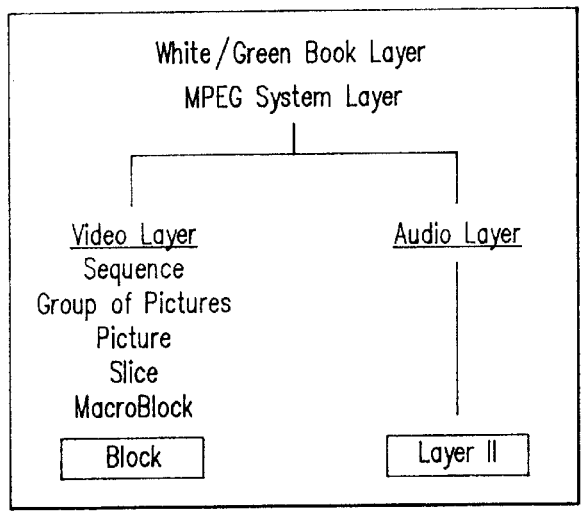
FIG. 1 shows conventional content layering for MPEG compression.

The video layer, under the system layer, includes the compressed video content. There are as described above an additional six layers under the video layer as shown in FIG. 1. These layers are the sequence layer, group of pictures layer, picture layer, slice layer, macroblock layer, and block layer. All but the macroblock and block layers contain additional control and variable information similar to the type of information in the system layer. Thus again the microprocessor is best suited for parsing the information down to but not including the macroblock layer.

Within the macroblock and block layers are compressed pixel data that requires, according to MPEG decompression, steps including 1) variable length decoding (VLD), 2) inverse zig-zagging (IZZ), 3) inverse quantization (IQ), 4) inverse discrete cosine transformation (IDCT), and 5) motion vector compensation (MVC), in that order. The VLD, IZZ, IQ, and especially IDCT are computationally intensive operations, and suitable for a peripheral processor or the microprocessor capabilities, assuming adequate processing capability being available in the microprocessor. However, in some cases depending on the microprocessor capabilities, the microprocessor itself may be insufficient in power or completely utilized already for parsing the upper layers.

The remaining task for video decompression is motion vector compensation (MVC) also referred to as frame reconstruction (FR). MVC requires retrieving large quantities of data from previously decompressed frames to reconstruct new frames. This process requires transferring large amounts of video data and hence is suited for the graphics accelerator conventionally present in a computer system. An example of such a graphics accelerator is the Trident TVP9512, or S3 Inc. Trio 64V.

The audio stream layer under the system layer includes the compressed audio content. Audio decompression requires 1) variable length decoding, 2) windowing, and 3) filtering. Since audio sampling rates are lower than pixel (video) sampling rates, computational power and data bandwidth requirements for audio decompression are relatively low. Therefore, a microprocessor may be capable of accomplishing this task completely, assuming it has sufficient computational power available.

Thus in accordance with the invention the MPEG decompression process is partitioned between the various hardware components in a computer system according to the computational and data bandwidth requirements of the MPEG decompression. Thus the system partitioning depends on the processing power of the microprocessor.

Therefore, while the present invention is applicable to computers including various microprocessors of the types now commercially and to be available, the following description is of a computer systems having a particular class of microprocessor (the 486DX2 class microprocessors commercially available from e.g., Intel and Advanced Micro Devices.) Thus this description is illustrative and the principles disclosed herein are applicable to other types of computer systems including other microprocessors of all types. As a general rule, it has been found empirically that no more than 30% of the microprocessor's computing capability should be used for MPEG decompression in order to preserve the remaining portion for other tasks. It has to be understood that this rule of thumb subjective and somewhat arbitrary; it is not to be is construed as limiting.

Moreover, the actual steps of MPEG decompression and apparatus to perform same are well known; see e.g. U.S. Pat. No. 5,196,946 issued Mar. 23, 1993 to Balkanski et al.; U.S. Pat. No. 5,379,356 issued Jan. 3, 1995 to Purcell et al., and European Patent Application publication 93304152-7, published Jan. 12, 1993, applicant C-Cube Microsystems, Inc. Therefore one skilled in the art will understand how to implement these well-known functions, which may be carried out in a variety of ways, all of which are contemplated in accordance with the invention.

Figure 2:
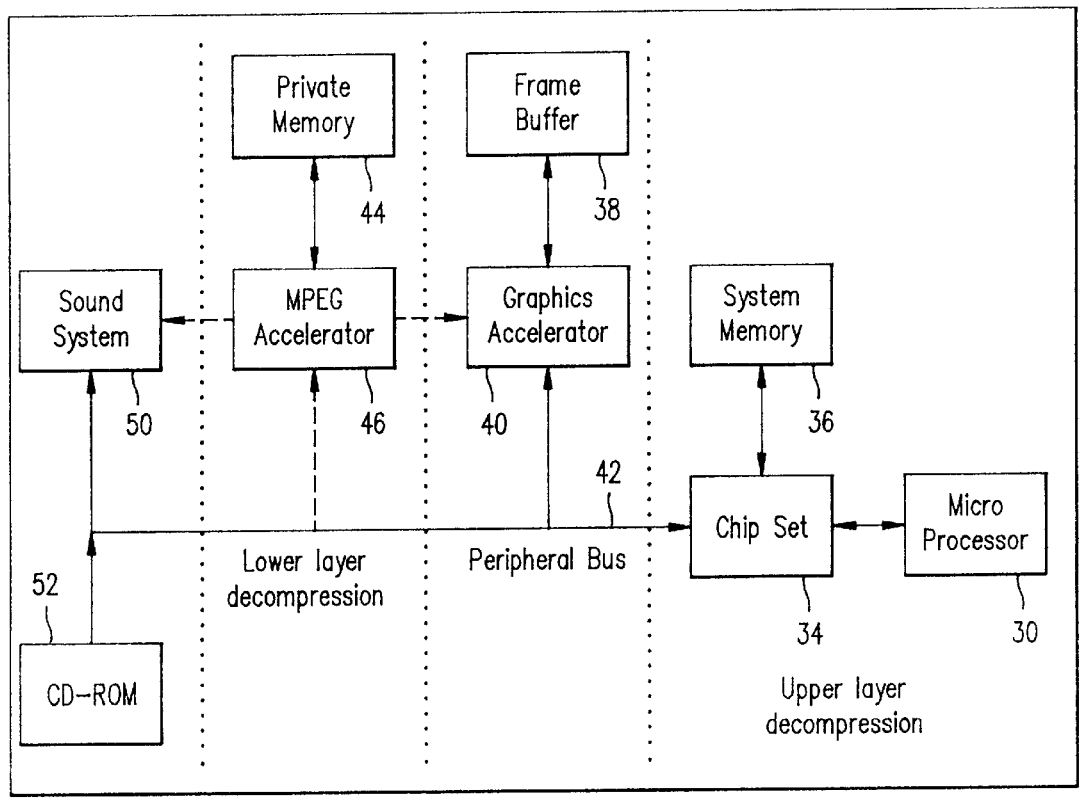
FIG. 2 shows one embodiment of the invention with partitioning of decompression including a dedicated MPEG processor with associated private memory, in a computer.

In accordance with the first embodiment of the present invention shown in FIG. 2, microprocessor 30 (the host processor) has been found only to have computational power sufficient to decompress the MPEG book layer and system layer. Also, in this computer system the graphics accelerator 40 e.g., the Trio 64V chip from S3 Inc. has insufficient computing power to accomplish the motion vector compensation (MVC) decompression. Therefore, a dedicated processor called the MPEG accelerator 46 is provided to perform the remainder of the MPEG decompression tasks. It is to be understood that the MPEG accelerator 46 may be any suitable processor or dedicated logic circuit adapted for performing the required functions. The private memory 44 is e.g. one half megabyte of random access memory used to accomplish the MVC and is distinct from the frame buffer in the FIG. 1 embodiment.

The other elements shown herein including the system memory 36, chip set 34, sound system 50, CD-ROM player 52, and the peripheral bus 42, are conventional. In one version of the FIG. 2 embodiment as shown by the dotted line connecting MPEG accelerator 46 to PCI (peripheral) bus 42, the MPEG accelerator 46 is connected to PCI bus 42 for video and audio decompression and typically would be a chip on an add-in card. The type of microprocessor 30, how the sound system 50 and other elements are connected, and the particular interconnection between the MPEG accelerator 46 and the peripheral bus 42 are not critical to the present invention. Further, the particular partitioning described herein is not critical to the present invention but is intended to be illustrative.

In a second version of the FIG. 2 embodiment, MPEG accelerator connects (see dotted lines) directly to graphics accelerator 40 for video decompression and to sound system 50 for audio decompression, not via peripheral bus 42. This version would be typical where MPEG accelerator 46 is located on the motherboard of the computer.

In FIG. 2, the lower layer MPEG decompression includes the functions performed by the private memory 44 and the MPEG accelerator 46. The upper layer decompression is that performed by microprocessor 30.

It is to be understood that typically the source of the MPEG program material is a CD-ROM to be played on CD-ROM player 52. However, this is not limiting and the program material may be provided from other means such as an external source.

Figure 3:
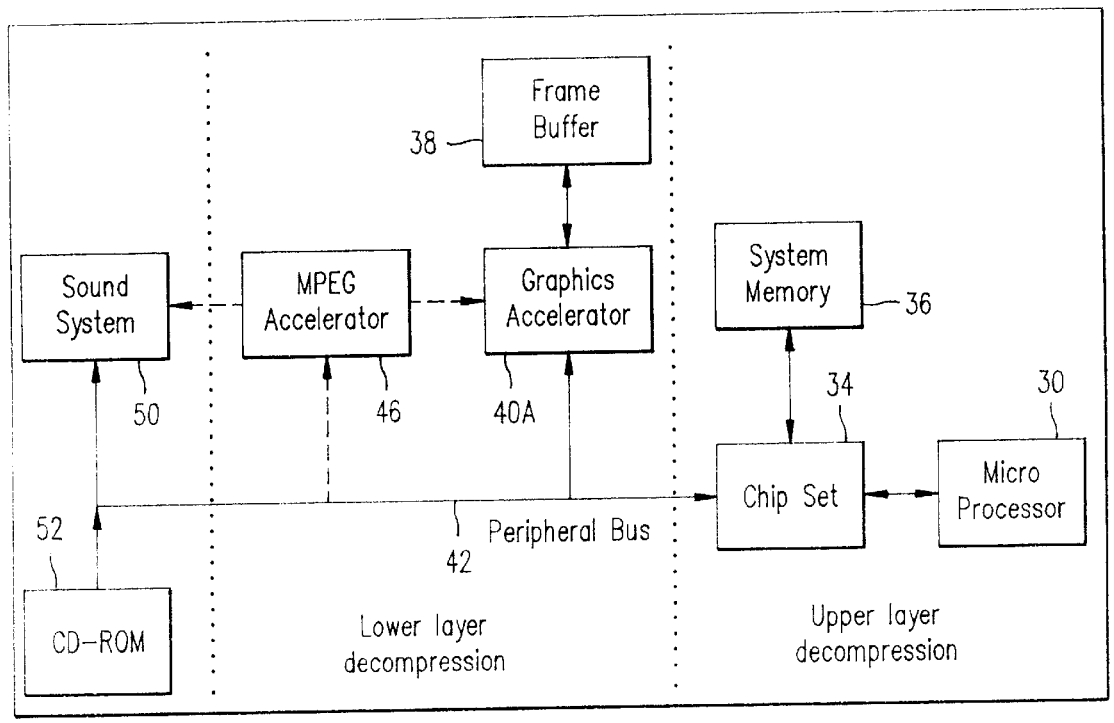
FIG. 3 shows a second embodiment of the invention also with a dedicated MPEG processor in a computer.

A second embodiment is shown in FIG. 3. Again, here the 486 class microprocessor 30 has sufficient computational power only to decompress the book layer and the system layer. In this embodiment a more capable graphics accelerator 40A has the capability to perform the MPEG decompression motion vector compensation (MVC). Therefore, the memory requirement for accomplishing MVC, which was accomplished by the private memory 44 in FIG. 2, here takes place either in the frame buffer 38 or the system memory 36. Therefore, in this case the lower layer decompression includes the functions performed by the graphics accelerator 40A, unlike the case with FIG. 2.

Figure 12:
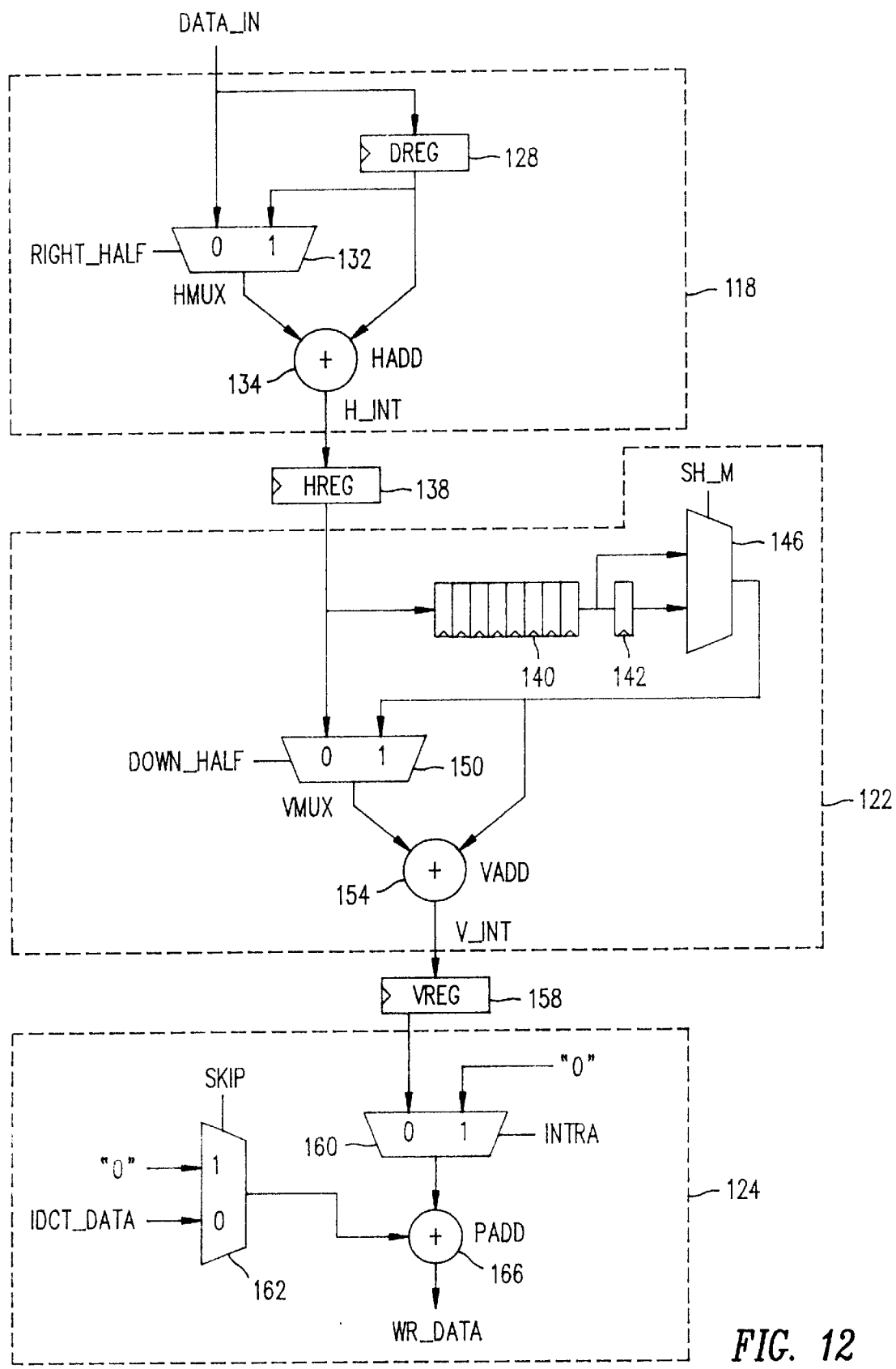
FIG. 12 shows a frame reconstruction circuit in accordance with the present invention.

The FIG. 3 embodiment, like that of FIG. 12, has two versions as shown by the dotted lines. In the first version, MPEG accelerator 46 communicates via peripheral bus 42. In the second version, MPEG accelerator 46 is directly connected to sound system 50 for audio decompression and to graphics accelerator 40A for video decompression.

Figure 4:
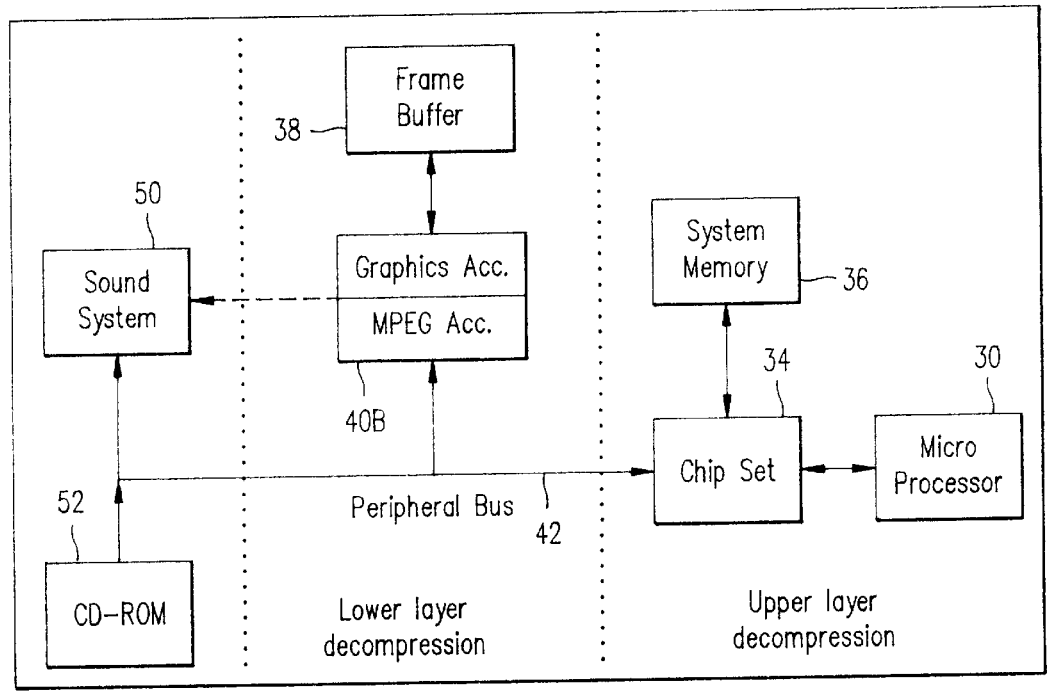
FIG. 4 shows a third embodiment of the invention with partitioning of MPEG compression in a computer system using a high performance graphics accelerator.

A third embodiment is shown in FIG. 4. In this case the MPEG accelerator functionality is included in a yet more powerful graphics accelerator 40B (a graphics controller). As in the embodiment of FIG. 3, the memory storage requirements for motion vector compensation (MVC) are satisfied by the off-screen memory in the frame buffer 38 or a non-cacheable portion of the system memory 36. The decompression of the audio layer is performed by either the sound system 50, the graphics accelerator 40A, or the microprocessor 30.

Also, in accordance with the invention there may be a partitioning of the audio decompression between the microprocessor 30 and a dedicated audio decompression processor which may be part of the MPEG accelerator. A system of this type for audio decompression is disclosed in the above mentioned U.S. patent application Ser. No. 08/489,489, filed Jun. 12, 1995, entitled "Audio Decoder Engine", Charlene Ku et al.

Thus in accordance with the invention the MPEG decompression process is partitioned between various elements of a computer system. The more powerful the host microprocessor, the more upper layer decompression tasks it handles. The remainder of the decompression tasks are off-loaded to a dedicated MPEG accelerator (processor) circuit, or to a graphics accelerator already conventionally present in a computer system on a layer-by-layer basis. Thus the need for dedicated circuitry for MPEG decompression is minimized in accordance with the capabilities of the other elements of the computer system, hence reducing total computer system cost and making MPEG decompression more widely available even in low cost computer systems.

The various elements of FIGS. 2, 3, and 4 are conventional, as is their interconnection, except for the MPEG accelerator and the decompression software in the microprocessor.

The following describes a system as shown in present FIG. 2 for video decompression. This particular embodiment of the invention is illustrative and is for MPEG 1 decompression. The two chief elements disclosed herein are (1) the software driver (program) executed by the microprocessor which performs the upper layer video decompression, and (2) the MPEG accelerator circuit which is a dedicated digital signal processor for video decompression.

Figure 5:
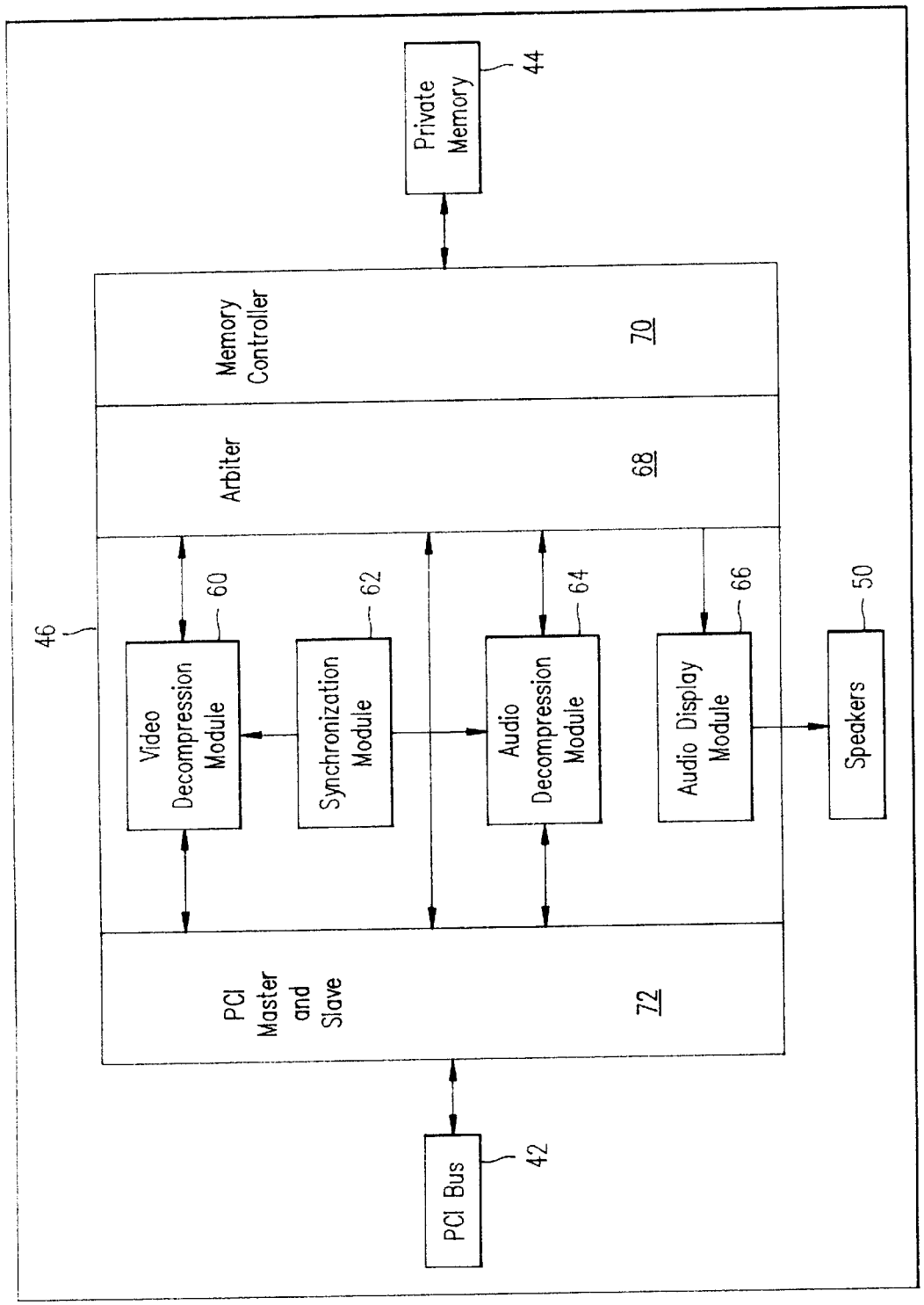
FIG. 5 shows a block diagram of a chip including MPEG video and audio decompression in accordance with the invention.

FIG. 5 shows a high level block diagram of a chip which includes the MPEG accelerator 46 of for instance FIG. 2. This chip provides both video and audio decompression. The video decompression is of the type disclosed herein and the audio decompression is of the type disclosed in the above-referenced copending and commonly owned patent application. The chip includes a video decompression module 60 which includes a video decompression engine (VDE), an audio decompression module which includes an audio decompression engine 64, and a synchronization module 62 for synchronizing the video and audio in their decompressed forms. The VDE is a hardwired (circuitry) engine. Also provided is an audio display module 66 which provides the function of sending decompressed digital audio data to an external DAC.

An arbiter 68 arbitrates amongst the various modules for purposes of private memory access. Also provided is a conventional memory controller 70 which interfaces with the private memory 44 of FIG. 2. Also provided is a peripheral master and slave bus interface 72 interfacing to the peripheral bus (PCI bus) 42.

Detail of the video decompression module 60 of FIG. 5 is described hereinafter.

The host processor decompresses the sequence layer and programs the quantization matrices in the VDE, and then parses the group of pictures layer and programs the VDE to start a frame decompression after it has transferred enough data into the buffer used by the VDE for the input video bit stream. The registers used for programming the VDE are double buffered so that the host processor can program one set at the same time that the VDE uses another set of registers. The VDE performs the rest of the variable length decoding starting from the picture layer down to block layer and does the IQ, IZZ, IDCT and FR on the 8×8 blocks generated by the VLD until the end of a picture, or until programmed to abort a picture. The FR puts decompressed frames in memory. Since the display and decompression order are different, the host processor keeps track of when a frame is ready to be displayed and programs the video decompression module to burst out data to be displayed.

Figure 6:
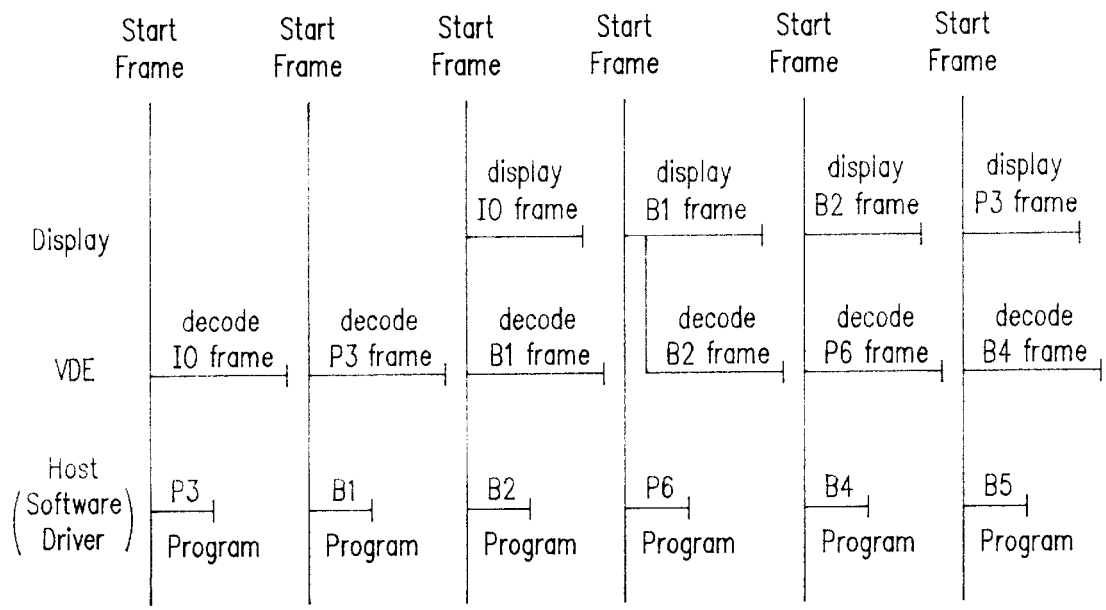
FIG. 6 shows host processor/VDE partitioning of video decompression.

An example of such partitioning is shown in FIG. 6, for frame sequence frames I0, B1, B2, B3, B4, B5, B6. Graceful degradation in accordance with the invention provides the ability to drop some video frames without affecting the quality of video and audio/video synchronization.

There are two main steps for graceful degradation: 1) the VDE is able to abandon a frame decompression and start on the next frame immediately if programmed to do so; 2) the ability of the display engine to suppress displaying an abandoned frame so that there are no visual artifacts on the screen due to a partially decompressed image.

Figure 7:
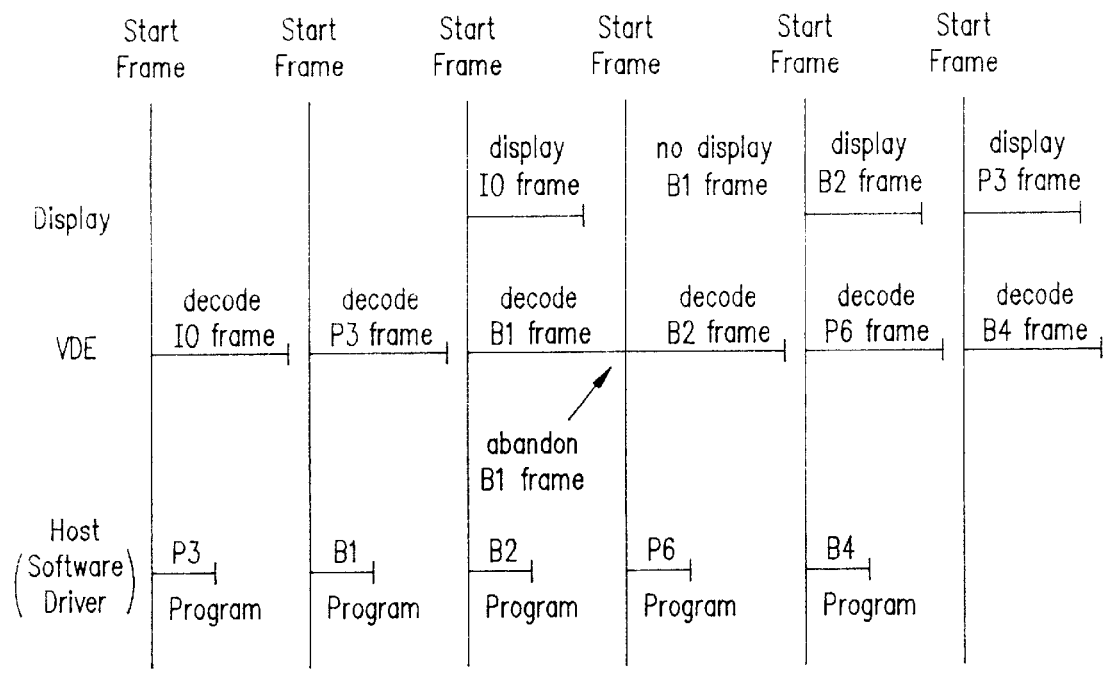
FIG. 7 shows graceful degradation of video decompression by abandoning frames.

The example of FIG. 7 shows the case of frames I0, B1, B2, P3, B4, B5, P6 in display order. Because of the delay in decoding B1 which is abandoned and suppressed (not displayed), the display becomes frames I0, B2, P3, B4, B5, P6. (I, B, P conventionally refer to MPEG frame types.) The master controller 82 (see FIG. 8) in the VDE interfaces to the host processor (not shown) and controls the flow of data through the pipeline stages VLD 84, IQ/IZZ/IDCT 88 and FR 92. When the master controller 82 is programmed to abort a frame, it resets the main state machines in VLD 84, IQ/IZZ/IDCT 88 and FR 92 and starts a new frame decoding. When the VDE aborts a frame, it signals the display engine (not shown) to suppress displaying the frame. The abort and suppress are usually done to B type frames to minimize the effect on quality, because if I or P type frames are aborted, all the intervening P and B type frames need to be discarded until the next I type frame. The circuitry is in one embodiment overdesigned to be very fast such that this feature (to abort frames due to lack of time) is rarely needed, so that the quality of video and video/audio synchronization is good. These are the rules for abandoning a frame:

1. Start next B frame and abandon current B frame-allowed. Any B frame can be dropped.
2. Start next P frame and abandon current B frame-allowed. Any B frame can be dropped.
3. Start next I frame and abandon current B frame-allowed. Any B frame can be dropped.
4. Start next B frame and abandon current P frame-not allowed since P frame cannot be dropped but the P frame can be given longer time and the next B frame can be abandoned.
5. Start next P frame and abandon current P frame-not allowed since P frame cannot be dropped and each P frame is given more time in this case until an I frame is next, then the uncompressed P frame is dropped.
6. Start next I frame and abandon P frame-allowed. End of predicted sequence.
7. Start next B frame and abandon I frame-not allowed. I frame is given more time in this case and the pending B frame can be dropped in this case.
8. Start next P frame and abandon current I frame-not allowed.
9. Start next I frame and abandon current I frame-allowed.

The VDE is implemented as a three stage pipeline with the master controller 82 controlling the interaction between three pipeline stages. The first pipeline stage is the VLD 84, the second is the IQ/IZZ/IDCT 88 and the third stage is the frame reconstruction (FR) 92. Stages 84, 88, 92 are chosen such that the circuitry associated with each stage is unique. For example, since IQ and IDCT both need a multiplier they are in the same stage to avoid duplicating the multiplier. Another advantage of three stages is that operation is pipelined and all three stages can operate simultaneously, reducing the overall time to decode with minimal circuitry. FR stage 92 is described in greater detail below.

To facilitate the three stage pipeline, temporary buffer BUFFER A 96 is placed between first and second stages and two buffers BUFFER B, BUFFER C 100, 102 between the second and third stages, so that IQ/IZZ/IDLT 88 and FR 92 work on different buffers. The buffers 100, 102 between second and third stages 88, 92 are provided because both stages 88, 92 use the buffers 100, 102 for storing intermediate results.

The master controller 82 controls and enables the flow of information from the VLD 84 to IQ/IZZ/IDCT 88 and FR 92. Master controller 82 makes sure that the VLD 84 is two blocks ahead of FR 92 and IQ/IZZ/IDCT 88 is one block ahead of FR 92 during normal operation. In case of skipped macroblocks or in case of a warning caused by a bad variable length code detected by VLD 84, the master controller 82 stalls the VLD 84 and IQ/IZZ/IDCT 88 stages until the FR 92 has finished reconstructing the skipped macroblocks (or the error blocks in case of the warning). In case of such a warning, the VLD skips to the next frame, and the FR must reconstruct the next slice.

The IQ step according to the MPEG 1 specification involves two multiplications, two additions and one saturation operation. To complete the IQ in an optimal number of cycles with minimum circuitry, two adders and one multiplier are provided. The IDCT calculations involve 11 multiplications and 29 additions per row/column. Here again to obtain optimal balance between circuitry and cycles to complete the IDCT, one multiplier and two adders are used. Thus the same circuitry may be used for both the IQ and IDCT in an optimal number of cycles. IDCT reads rows of data from a buffer and writes back the result after 1D-IDCT into the same buffer. IDCT then reads columns of data from the same buffer and does 1D-IDCT and writes them back as columns. Because of this, IDCT avoids doing a transpose operation after the 1D-IDCT on the 8 rows and avoids using a transpose RAM (saving cycles and circuitry respectively).

To reduce cycles in IDCT processing, some of the operations are performed transparently. For example, the first stage in 1D-IDCT on a row/column of 8 elements is shuffle where out[x] is the output element number x after stage 1, and in[x] is the input element number x:

out[0]=in[0]-----(1)

out[1]=in[4]----- (2)

out[2]=in[1]. . .

In the second stage for example:

2nd_out[0]=out[0]+out[1]

Instead of using some cycles to read out elements and writing them back at the correct locations, the shuffle operation (part of a well-known algorithm) is a transparent operation going directly to the second stage 88 and reading from the correct locations. In the above example using (1) and (2) this becomes: 2nd_out[0]=in[0]+in[4].

In this way eight cycles are eliminated in processing a row/column which would be used for reading each of the eight elements and writing then back for the shuffle.

Figures 8, 9:
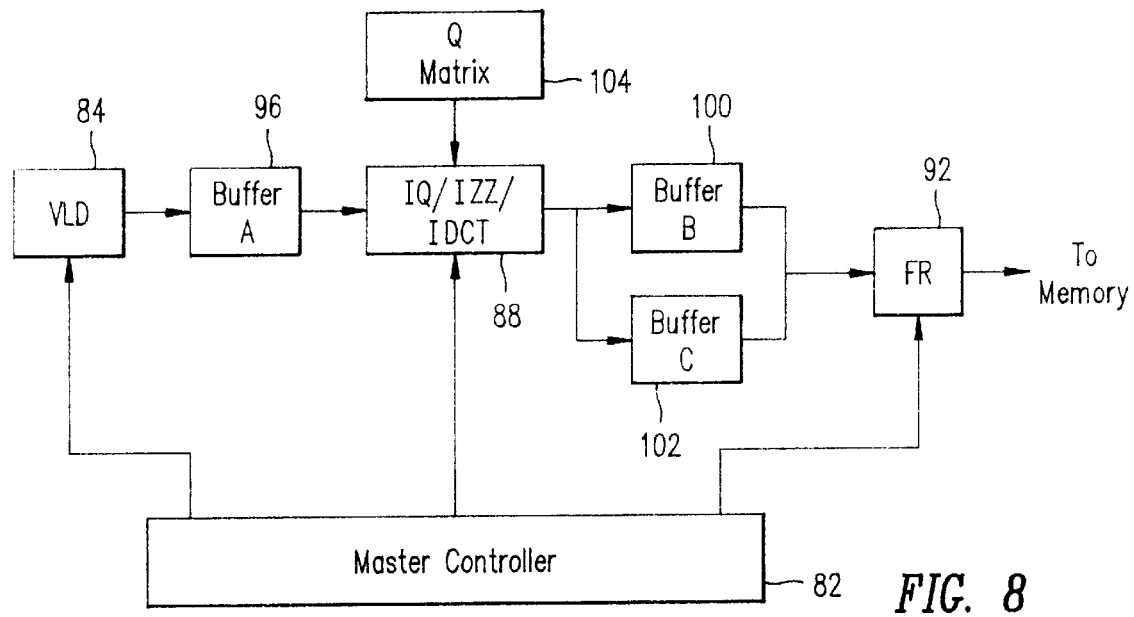
FIG. 8 shows in a block diagram three stage pipelining in the VDE.
FIG. 9 shows a transparent IZZ process.

Also, IZZ is performed transparently during IQ. The DCT coefficients are read in zigzag order from the VLD output buffer, go through IQ and are written to the IQ/IZZ/IDCT buffers 100, 102 in raster scan order as shown in FIG. 9. IQ matrix 104 stores the quantization coefficients. These are multiplied by the DCT coefficients and the quantization scale factors (from the bit stream) per the conventional MPEG IQ process.

The VLD module is in one embodiment purely synthesized logic with no structured memories, i.e. no ROM, RAM or PLA. All the look-up tables are implemented with logic. This advantageously eliminates any need for read only memory.

Since the motion vector calculation requires different circuitry (adder and combinational logic) compared to the rest of the VLD, MVC is done off-line and at the same time that the DCT coefficients are being decoded. This speeds up the VLD because the motion vector calculation does not stall the rest of the VLD. Also in this case the same circuitry is used for all four motion vector calculations-motion horizontal forward, motion horizontal backward, motion vertical forward and motion vertical backward-thereby reducing needed circuitry.

This portion of the disclosure is directed to the frame reconstruction (FR) aspect of MPEG decompression referred to above. While this frame reconstruction is directed particularly to decompression of MPEG 1 type data, it is also applicable (with modifications of the type well-known in the art) to MPEG 2 decompression. The stages of MPEG decompression which are prior to frame reconstruction include those referred to above as VLD, IQ, IZZ, and IDCT which are carried out as described above, or alternatively conventionally, in combination with the present frame construction method and apparatus.

Thus the present frame reconstruction circuit reconstructs blocks or macroblocks in a video frame. The post-processing element selects and combines the horizontally and vertically interpolated data with the IDCT data, depending on the type of frame i.e., whether it is an I-type frame, P-type frame or B-type frame. To reconstruct a B-type frame for a bidirectional prediction in one embodiment, the horizontal and vertical interpolation elements are each used twice by means of a feedback path.

Also included is an error/warning correction process, by which if the bit stream is unable to be decoded in a picture layer, the VLD (a previous step in MPEG decompression) generates an error signal. A warning signal is generated under particular circumstances which require error recovery in the frame reconstruction step to reconstruct the current slice as skipped macroblocks.

Each of the three elements is comprised of standard logic elements, with a minimum gate count, so as to provide an economical solution for frame reconstruction using logic circuitry.

As described above, MPEG 1 includes three types of "pictures" where pictures are defined as one layer of the compressed MPEG video data. The three types of MPEG pictures are B, I, and P. P-type pictures use motion compensation to exploit temporal redundancy in the video for compression purposes. A decoder (decompression circuitry or processor) constructs a predicted block of picture elements from picture elements in a previously transmitted picture in the MPEG video data. Motion within the pictures, for instance a pan, usually implies the picture elements in the previous picture would be a different position than the picture elements in the current block, and the displacement is described by motion vectors encoded in the compressed video bit stream.

Figures 10, 11:
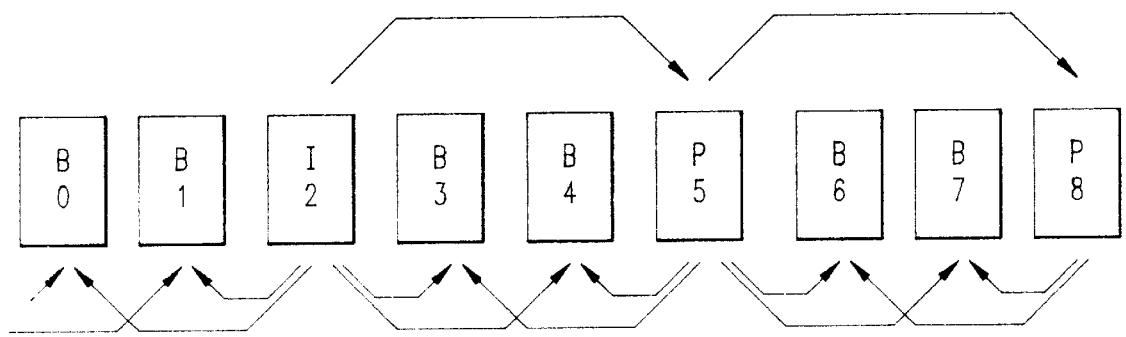
FIG. 10 shows a group of pictures in display order in accordance with MPEG compression for frame reconstruction.
FIG. 11 shows an arrangement of slices in a picture in accordance with MPEG compression.

Consider the typical group of pictures depicted diagrammatically in FIG. 10. The I picture, which is picture number 2, is decoded without requiring any motion vectors. The first P-type picture which is number 5, is decoded using the motion vectors from picture 2. This motion compensation is called the forward motion compensation since it is forward in time. (It is to be understood that time is proceeding from left to right in FIG. 10.) P picture number 8 uses forward motion compensation from picture number 5. P-type pictures always use forward motion compensation from the last transmitted I or P picture. This is all conventional in MPEG.

B-type pictures may use motion compensation from the previous I or P picture, from the next I type or P-type picture, or both, i.e., from the last two transmitted I or P-type pictures. Prediction in MPEG is called forward if reference is made to a picture ("reference frame") in the past and called backward if reference is made to a picture in the future. For example, B-type picture number 3 uses forward motion compensation from I-type picture number 2, and backward motion compensation from P-type picture number 5. B-type pictures may use forward and backward motion compensation and average the result. This operation is called MPEG interpolative motion compensation.

As described above, MPEG defines an additional layer in compressed video referred to as a slice. Each picture includes a number of slices where each slice consists of an integral number of MPEG macroblocks in raster scan order. Each macroblock includes a number of MPEG blocks; each block is a square array of 8 pixels×8 pixels. Slices can be of different sizes within a picture, and the division in one picture need not be the same as a division in any other picture in the compressed video bit stream. The minimum number of slices in a picture is one, the maximum number being equal to the number of macroblocks in a frame. One exemplary arrangement of slices in a picture is depicted in FIG. 11. This shows the arbitrary length of each slice within a particular picture. In this case, there are ten slices in the single picture which here corresponds to a single video frame, although that is not necessarily the case.

FIG. 12 shows schematically a circuit for carrying out frame reconstruction in accordance with the present invention. This corresponds to FR stage 92 described above. As shown by the dotted lines, the three chief elements are horizontal interpolation element 118, vertical interpolation element 122, and post-processing (selector) element 124. The horizontal interpolation element 118 includes a D-type flip-flop (D register) 128, a two input multiplexer 132, here also labelled HMUX which is controlled by the signal RIGHT HALF, and an adder 134 here also labelled HADD which can accept additional operands for rounding and other purposes.

Incoming data (DATA IN) from the previous portions of the decompression process i.e., the IDCT portion, is latched into the D-type flip-flop 128 and then interpolated with the next incoming data, DATA IN, when signal RIGHTHALF is active (high i.e., having a logic value of one) in order to perform horizontal interpolation. Thus horizontal interpolation is an averaging or digital filtering process in accordance with the present invention. The horizontal interpolated data from adder 134 is then provided to an (optional) D-type flip-flop 138 also labelled HREG for storing horizontal interpolated data HINT.

The vertical interpolation element 122 includes a shift register including elements 140 and 142 where element 140 includes in this case eight register stages and element 142 includes one additional register stage. The multiplexer 146 is connected to receive the outputs from both element 142 and element 140 and is controlled by signal SHM. The output of multiplexer 146 is provided as a first input signal to the multiplexer 150 also labelled VMUX which is controlled by the signal DOWN HALF. The other input to multiplexer 150 is provided from the horizontal interpolation element 18 via register 138.

The output of multiplexer 150 is then provided as one input to adder 154 also labelled VADD, the other input of which is provided from the output of multiplexer 146. Adder 154 can accept additional operands for rounding and other purposes. (Other purposes would include shifting the overall value by a predetermined amount to provide an offset.) Thus the horizontally interpolated data from register 138 goes into the shift register including elements 140 and 142 and is interpolated with the signal HINT of the next line at the same vertical position when signal DOWN HALF is high. The purpose of the shift register including elements 140 and 142 is to interpolate signal HINT with that of the next line and immediately below in the block. In this case, each block is 8 pixels×8 pixels and hence an 8 pixel delay arrives at a pixel immediately under the previous pixel of interest. This provides the desired vertical interpolation or averaging, i.e. digital filtering. The number of shifts for the shift register is N if there is no horizontal interpolation or N+1, (using element 42) if there is to be horizontal interpolation.

D-type flip-flop 158, also labelled VREG, is optional for storing the vertically interpolated data VINT and serves the function described below.

The selector element 124 provides post-processing of the output signal VINT from vertical interpolation element 122. Selector element 124 includes two multiplexers respectively 160 and 162 and one adder 166 also labelled PADD. The two multiplexers are controlled separately respectively by control signals INTRA and SKIP. Multiplexer 162 accepts as an additional input the IDCT data when the SKIP signal is logic low (value 0) which is added to the register output 158 when INTRA is asserted low (value 0). Thus the vertically interpolated data VINT is processed with the input data IDCT data, and the final result WR DATA is provided as an output signal from the selector element 124.

It is to be understood that FIG. 12 depicts a circuit suitable for processing only a single data bit. In actuality at least eight such circuits are provided for a single decoder, each such circuit being identical and side by side and connected to an eight bit parallel bus carrying DATA IN and driving an eight bit parallel bus WR DATA for the output signal. As is well known in MPEG, each macroblock includes six blocks, four of which are luminance blocks and two of which are chrominance (color) blocks. Each of these blocks includes 8 pixels×8 pixels where each pixel is expressed by 8 bits of data. The circuit of FIG. 12 thus processes one pixel at a time.

The various control signals shown in FIG. 12 are provided as follows. Multiplexer 132 is driven by the signal RIGHT HALF which is decoded from the MPEG bit stream and is provided from the VLD decompression circuit. Conventionally, in MPEG 1, RIGHT HALF is provided by logic for motion vector reconstruction. If either MPEG vector RECON RIGHT FOR or RECON RIGHT BACK (each being eight bit vectors) is an odd number, and also is in a 1/2 pixel unit, then RIGHT HALF is asserted high (value 1).

Each of the clocked elements in FIG. 12, i.e. elements 128, 138, 140, 142, 158, is driven by the memory clock signal which drives the entire chip of which this circuit is a part. Typical clock frequencies are 40 or 50 MHz, which is conventionally provided from a crystal oscillator.

Registers 138 and 158 are optional and included for timing purposes in case the signal path is too long, to meet the cycle time requirement. The control signal SHM is derived from control signal RIGHT HALF and is e.g. a few cycles delayed version of the RIGHT HALF signal. The amount of delay is zero to N+1 cycles where N is the dimension of the block in pixels, as used above. Thus simple logic (not depicted) generates the signal SHM from the RIGHT HALF signal. The control signal INTRA controlling multiplexer 160 is a bypass signal which allows bypassing of the output of both the horizontal interpolation element 118 and the vertical interpolation element 122 by instead providing the 0 (zero) signal as an output signal from multiplexer 160 when INTRA is asserted logic high (value 1). Signal INTRA is derived from the compressed bit stream and provided from the VLD decompression circuitry.

Signal INTRA is provided as is conventional in MPEG 1. If the MPEG code word PICTURE CODING TYPE has a value of 001, then that picture is INTRA-coded, and INTRA is asserted high. If the MPEG code word MACROBLOCK INTRA has a value of 1, then that macroblock is INTRA-coded, and similarly INTRA is asserted high.

Register 158, similar to register 138, is provided for timing purposes and is optional. The SKIP control signal for multiplexer 162 indicates to skip reading from the IDCT block, and is used when there exist skipped macroblocks or multiple skipped macroblocks. The SKIP signal is provided as is conventional in MPEG. If MPEG code word MACROBLOCK ADDRESS INCREMENT has a value greater than 1, or if MPEG code word MACROBLOCK ESCAPE is present, then SKIP is asserted high.

Adders 134, 154 and 166 are e.g. ripple adders. For higher performance, these alternatively are carry select adders or carry look-ahead adders. These higher performance adders would be especially useful for an MPEG 2 implementation. In order to accommodate the needed carry bit, the full frame reconstruction circuit of FIG. 12 is a 9 bit data path from the HREG register 138 through the VADD adder 154. Each adder 134, 154 and 166 is a rounding adder with a built-in one or two bit rounding function in order to output an 8 bit result. Note that the IDCT data signal is a 9 bit twos complement signal. The entire selector element 124 is a 9 bit data path except that, as described above, the adder 166 is a rounding adder outputting an 8 bit result as the signal WR DATA.

The following describes the logic used by selector element 124 with relation to the picture types of FIG. 10. The entire frame reconstruction circuit of FIG. 12 is used for reconstructing blocks or macroblocks in a video frame. The data flows for reconstructing respectively the I-type frame, the P-type frame and the B-type frame are as follows:

1. To reconstruct an I-type frame, the IDCT data flows to WR DATA; the horizontal and vertical interpolation elements 118 and 122 are not used. Thus signal INTRA is asserted high (value 1) and signal SKIP is asserted low (value 0).
2. To construct a P-type frame, both the outputs of the horizontal interpolation and vertical interpolation elements 118 and 122 and the IDCT data are used. In this case the INTRA signal is asserted low and the SKIP signal is also asserted low. However, for skipped blocks (versus macroblocks) the IDCT data is not used. Thus SKIP is asserted high or low depending on the type of macroblock. If the macroblock is a skip-type, SKIP is high; otherwise, SKIP is low.
3. To construct a B-type frame, the horizontal and vertical interpolation elements 118 and 122 are used once if there is only one direction of prediction, i.e. forward prediction or backward prediction. For bidirectional prediction, i.e. forward and backward prediction, horizontal and vertical interpolation elements are each used twice, once for forward and once for backward prediction.

Figure 13A:
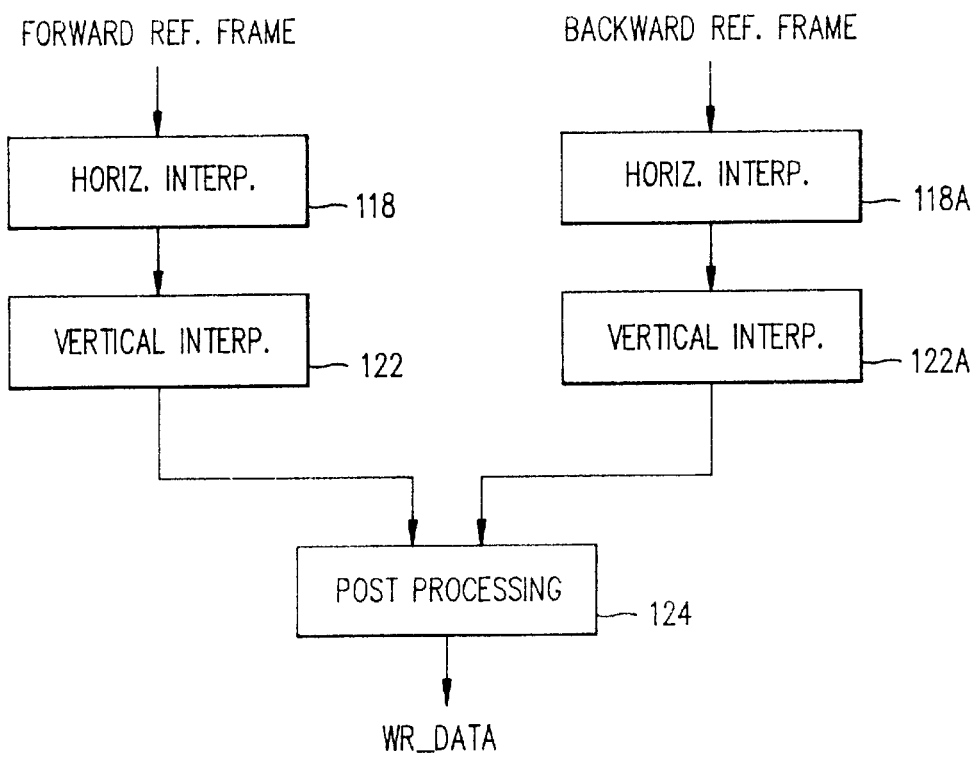
FIGS. 13A and 13B show respectively parallel and serial processing in a frame reconstruction circuit as used for reconstruction of a B-type frame in accordance with the present invention.

This is performed as shown in FIG. 13A by duplicated horizontal and vertical interpolation element circuitry for parallel processing of data coming from two different sources i.e., forward reference frame and backward reference frame. The first parallel path includes elements 118, 122 and 124: the second path includes elements 118A, 122A, and 124.

Figure 13B:
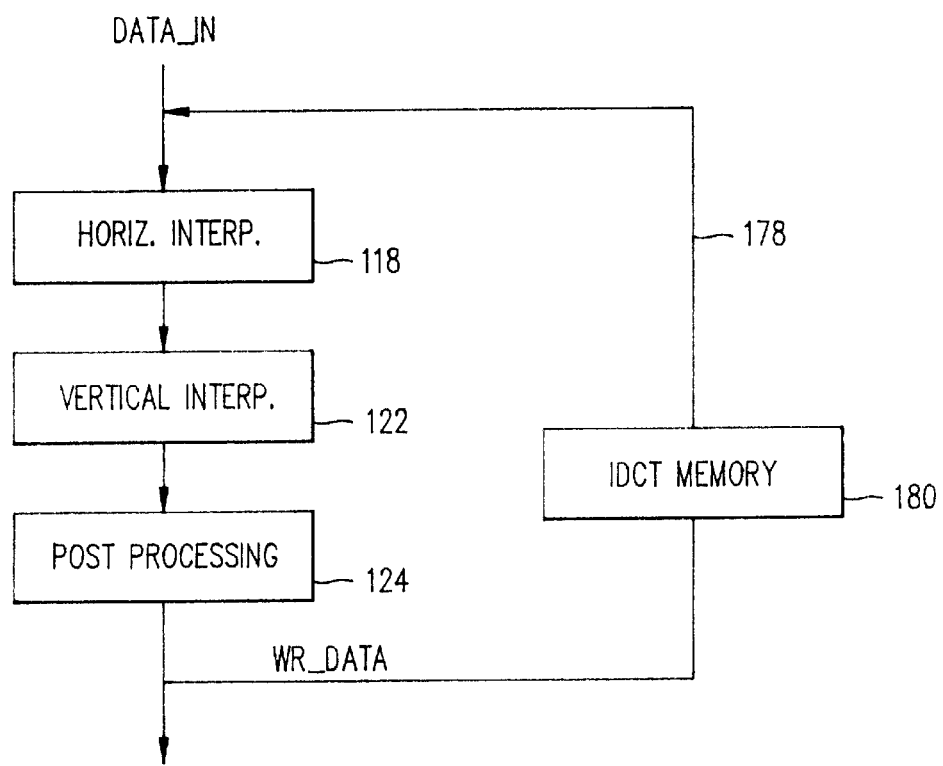

Alternatively as shown in FIG. 13B, this is performed by serial processing, using one set of horizontal and vertical interpolation elements 118, 122 in multiple passes, where the first pass is for one direction of prediction and a second pass is for the other direction of prediction. In this case the data path is used twice via a simple feedback loop 178, and there is an additional storage register 180 which stores intermediate data. This is called the IDCT memory which then in the next pass is read backwards for the other direction of prediction.

For reconstruction of the B frame hence the INTRA signal is asserted low, but since the IDCT data is not used, the SKIP signal is variously asserted high or low, as for the P-type frame.

Also, there is a frame reconstruction logic circuit (not shown) which conventionally decodes the picture type from a code word present in the MPEG bit stream.

Advantageously, the circuit of FIG. 12 processes one data entry for each clock cycle. Since the data arrives in two data entries every two clock cycles, which is equivalent to one data entry per clock cycle, no memory (such as FIFO memory) is needed for buffering between the memory and the data in terminal advantageously. On the output side at the WR DATA port, also no FIFO or other such memory is needed. Due to the three stage pipeline architecture described in the above-referenced first application, the buffers between the second (IDCT etc.) stage and the third (FR) can be used for storing intermediate result and final result data WR DATA. This eliminates the need for any output FIFO because the buffers between IDCT and FR can serve this purpose.

Also present in accordance with the invention is an error/warning correction process. If the compressed video bit stream is not able to be decoded in the picture layer (due to errors in the bit stream, the first pipeline stage (which is the VLD) generates an error signal. If the VLD cannot decode the bit stream in the slice, macroblock, or block layer, a warning signal is conventionally generated by the VLD. Recovery from such errors is made via an interrupt. In this case the VLD transmits the error signal and hence an interrupt is generated along with the error signal. Recovery from the warning signal is performed by skipping a current slice. When the frame reconstruction circuit of FIG. 12 receives the warning signal, it reconstructs the current slice as skipped macroblocks via the SKIP signal.

If the current picture is a P-type picture, in this case the frame reconstruction circuit reconstructs the remaining macroblocks in the slice with a reconstructed motion vector equal to zero and no DCT coefficients, as described above. For the case of a B-type picture, the macroblocks have the same macroblock type, (forward, backward, or both motion vectors) as the prior macroblock, differential motion vectors are equal to zero, and there are no IDCT coefficients used, as described above. Thus whatever reference frame was being used before the VLD became "stuck" continues in use. It is assumed that the motion vector is zero for a P-type frame, and there is no change in the motion vector for B-type frame. This is accomplished by conventional logic.

Advantageously, frame reconstruction in accordance with the present invention is economical in logic; for instance the circuit of FIG. 12 may be implemented for all 8 pixel data bits using approximately 2,800 gates. Due to bus and memory inefficiencies, a block of 8 pixels×8 pixels is decompressed in less than 450 cycles. According to the MPEG standard, 840 clock cycles are available for playing (decompressing) 30 MPEG SIF format video frames per second. (SIF is the conventional MPEG 1 frame size of 352×240 pixels). Since the circuit is partitioned into a three-stage pipeline as described above, where the first stage is the VLD, the second stage is IQ/IZZ/IDT, and frame reconstruction (FR) is the third stage, each stage processes an 8 pixel×8 pixel block within 840 cycles. Hence the actual maximum throughput of the video decompression circuit is considerably faster than the MPEG requirement.

While the presently frame reconstruction disclosed embodiment is of a logic circuit including a number of conventional "hardwired" logic elements, the invention is not so limited. Alternatively the present frame reconstruction can be carried out in e.g. programmable logic or a programmable processor, given sufficient performance to process video data.

Included in the microfiche appendix which is a part of this disclosure is a computer code listing entitled "SCCS: vdetop.vhd". This listing is VHDL code which is a description of the circuitry of the video decompression module as described above. Using appropriate commercially available translation tools, it is easily accomplished to provide circuitry as described by this VHDL code.

Figure 14A:
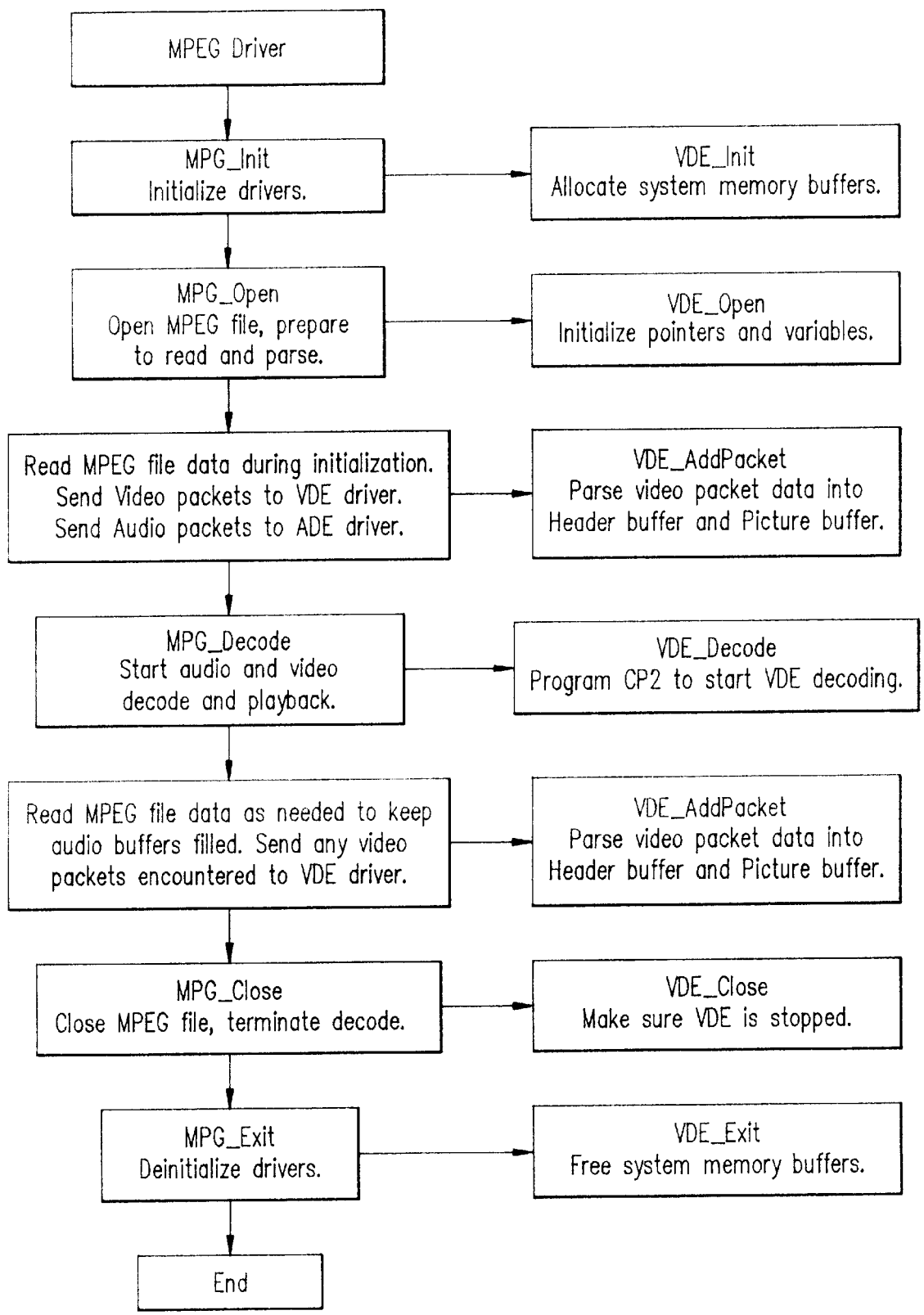
FIGS. 14A to 14F show a flowchart for a computer program for performing higher level video decompression in a host processor.
Figure 14B:
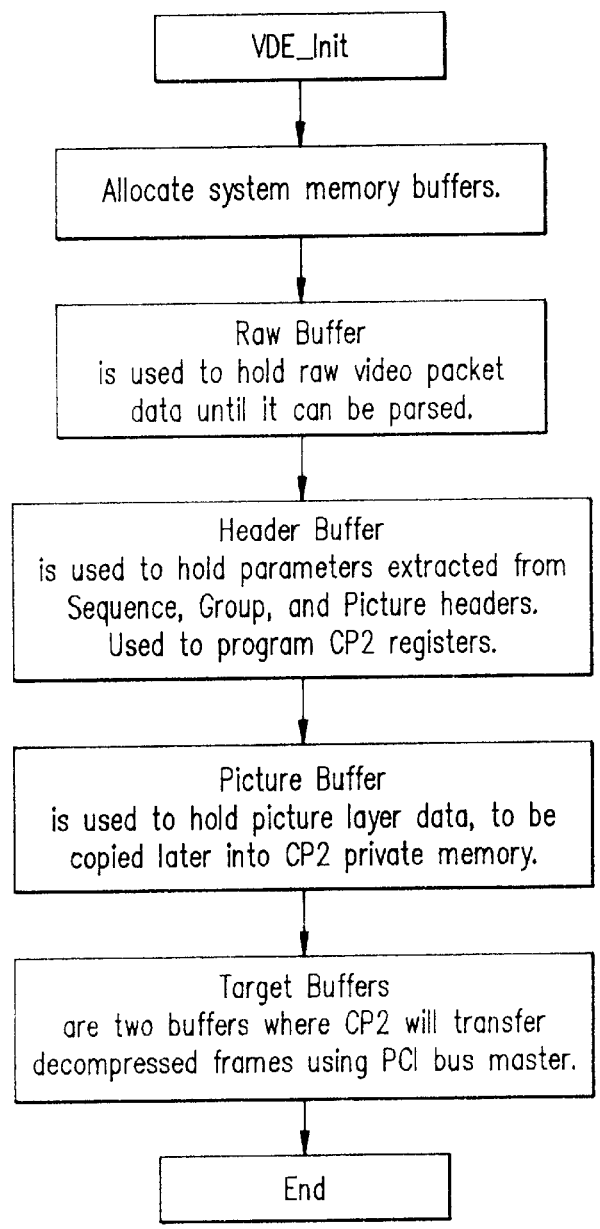
Figure 14B:
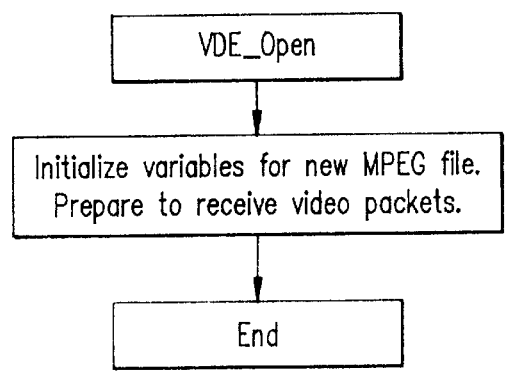
Figure 14C:
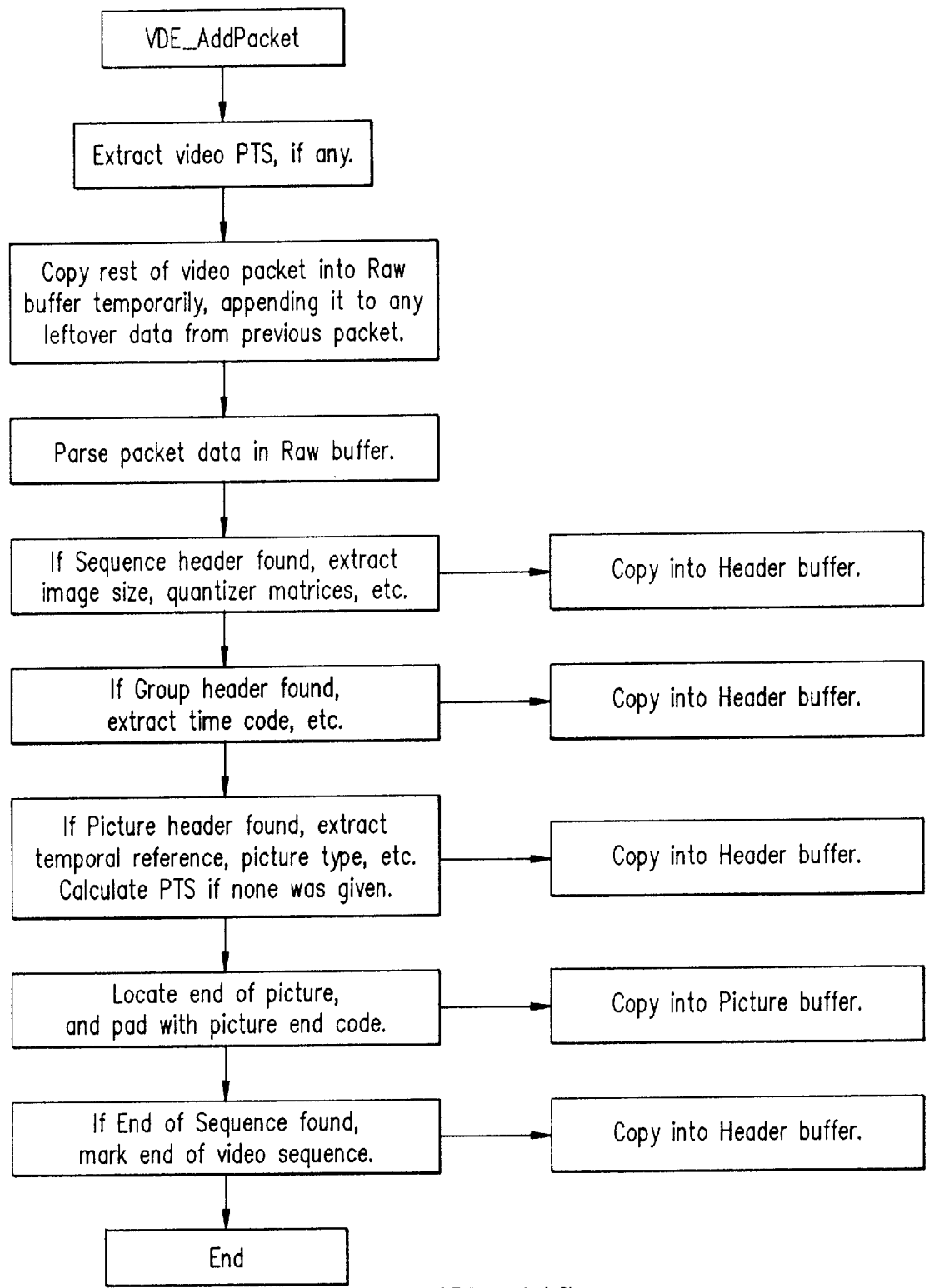
Figure 14D:
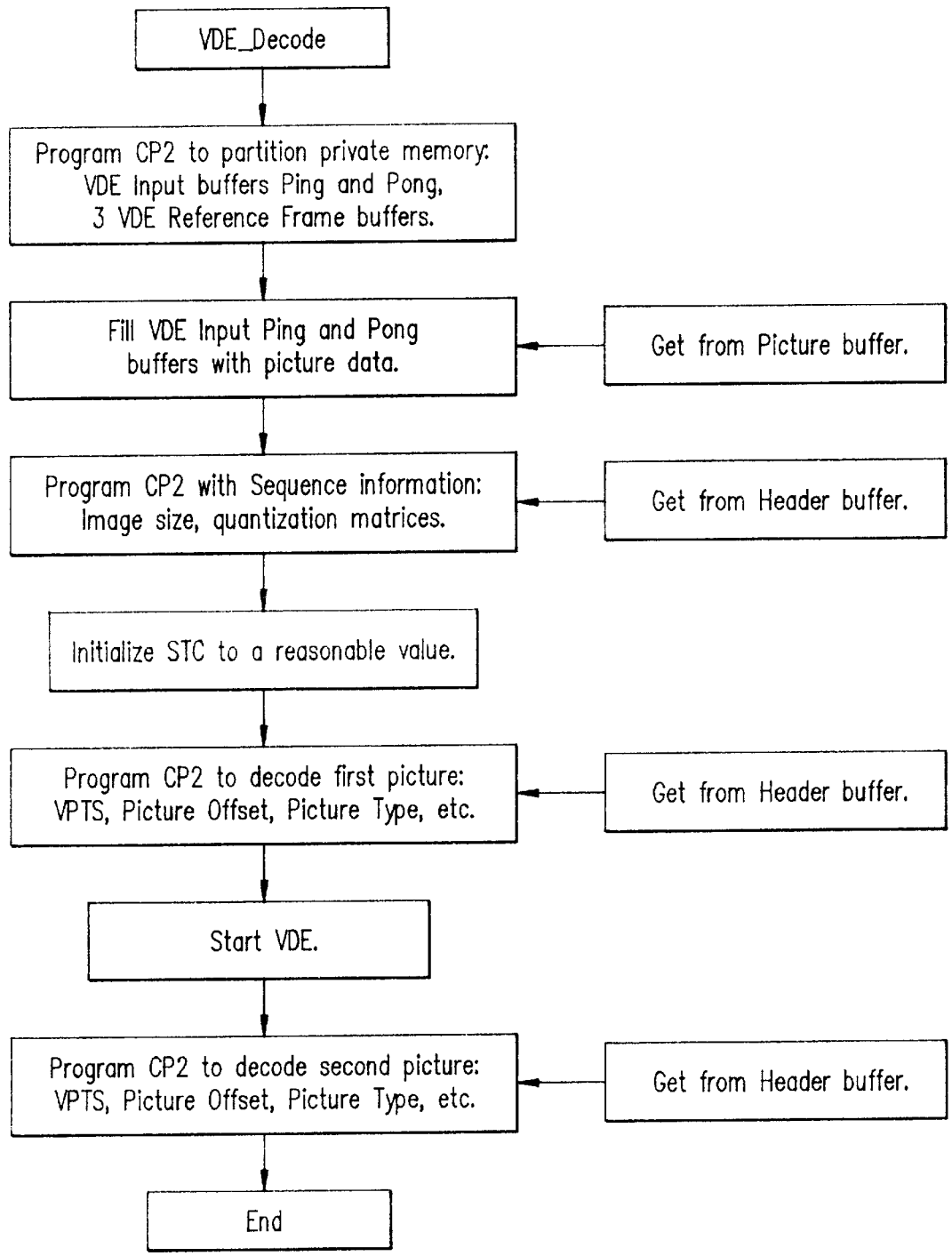
Figure 14E:
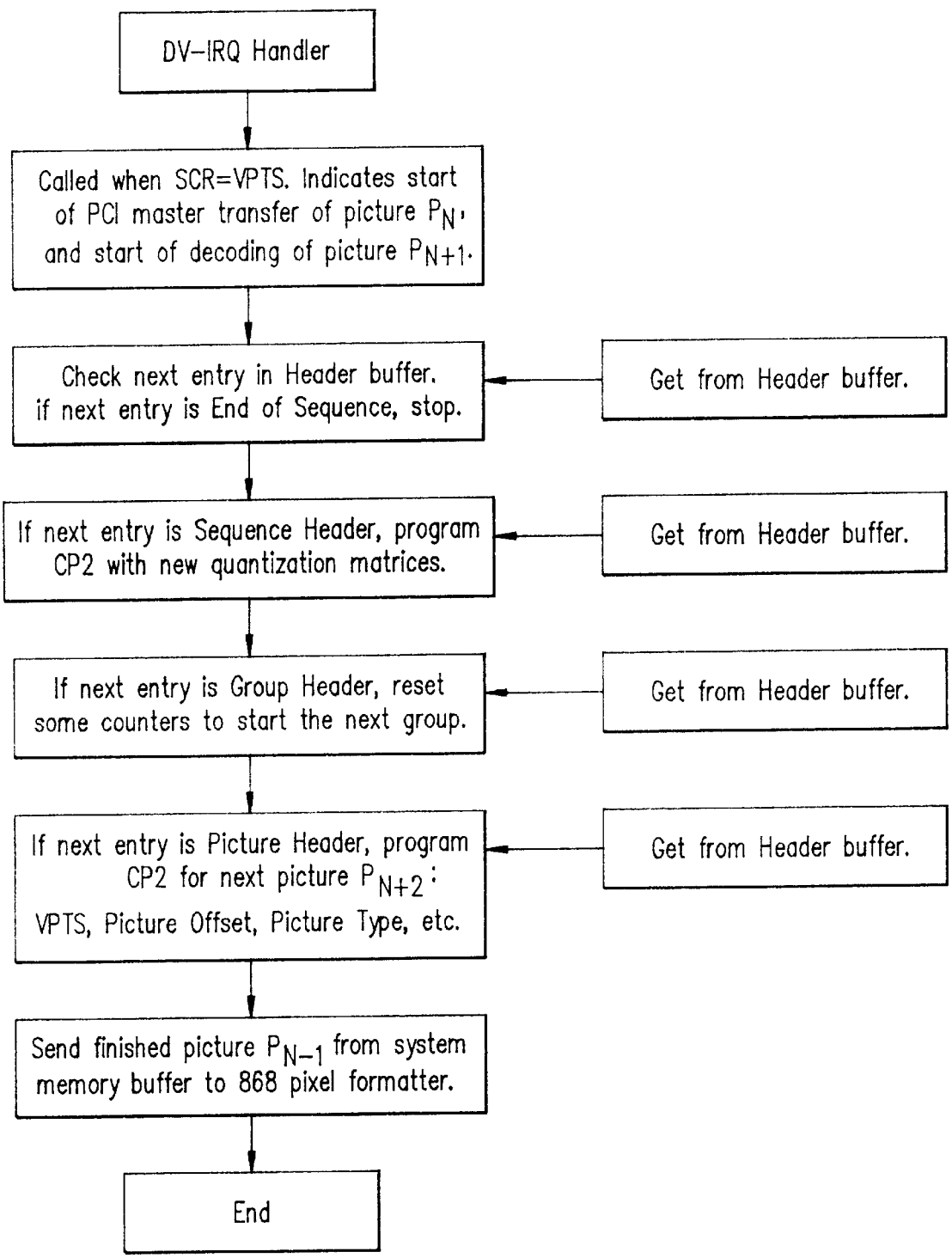
Figure 14F:
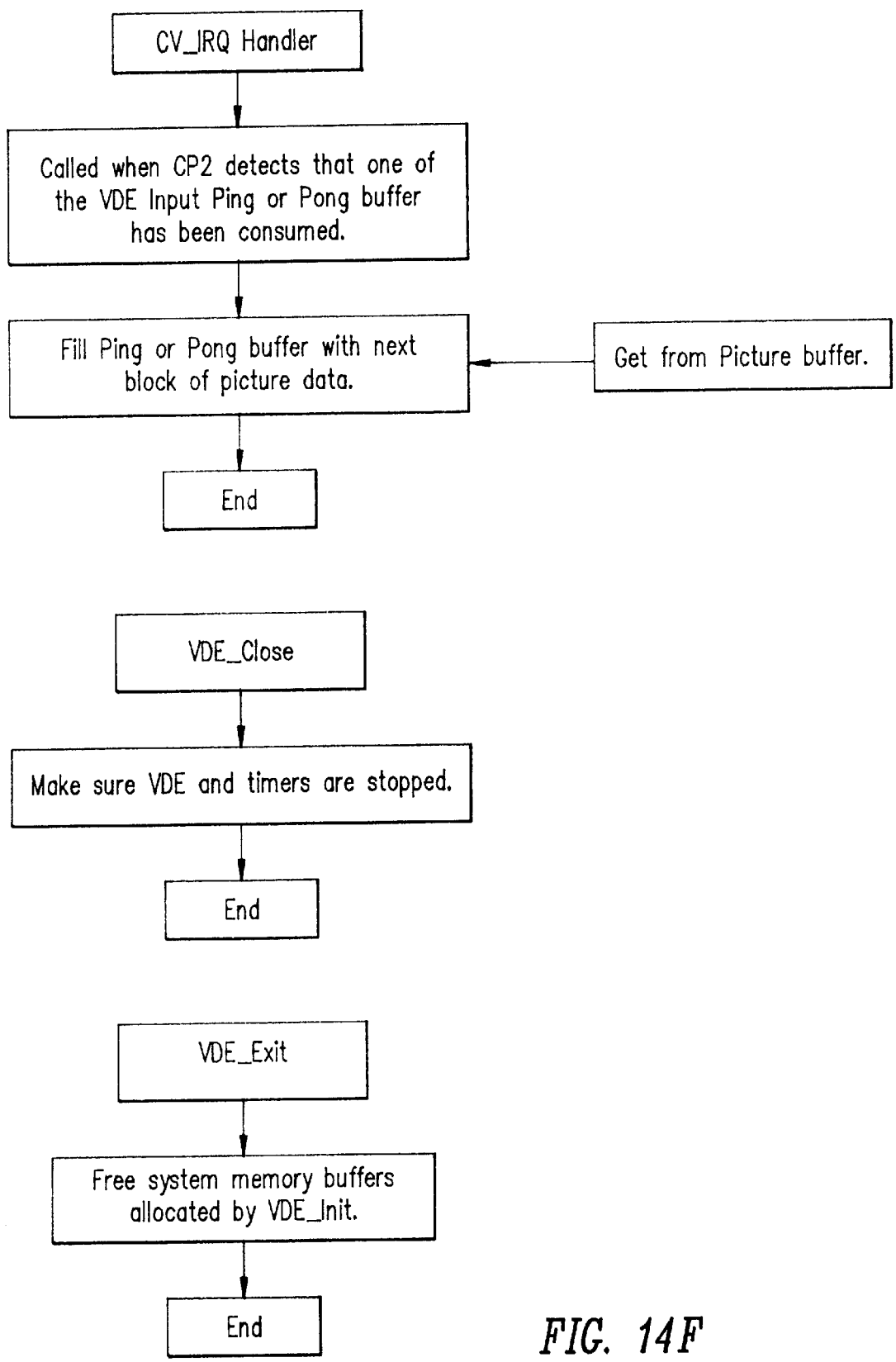

The other element for video decompression referred to above is the software driver (program) executed by the host computer microprocessor. A flow chart of this program is shown in FIGS. 14A through 14F. FIG. 14A shows the MPEG driver modules. This MPEG driver includes code for video decompression, audio decompression and synchronization therebetween. The right hand side of FIG. 14A shows the video decompression, i.e. VDE code, modules. This includes six modules which respectively represent VDE initialization, open, add packet, decode, close and exit. Detail of each of these modules is shown in FIGS. 14B through 14F on a step by step basis. This flow chart is self explanatory to one of ordinary skill in the art, and therefore its content is not repeated here.

An actual computer program which implements this video decompression for the higher level MPEG layers is included in the microfiche appendix and entitled "CP3 VDE Driver—High Level Routines." This is annotated to refer to the various modules shown in the right hand portion of FIG. 14A and also additional related modules involved in the video decompression process. This computer program is written in the "C" and assembly computer languages.

The various computer code listings herein are not limiting but are illustrative of a particular embodiment of one version of the present invention. It is to be understood that given the description of the embodiments of the invention herein, various implementations of systems in accordance with the invention may be made using different types of computer languages and other circuitry arrangements.

This disclosure includes copyrighted material. The copyright owner gives permission for facsimile reproduction of the patent document and patent disclosure as this appears in Patent and Trademark Office patent files or records, but otherwise reserves all copyright rights whatsoever.

This disclosure is illustrative and not limiting; further modifications to the process and apparatus disclosed herein will be apparent to one skilled in the art and are intended to fall within the scope of the appended claims.

We claim:

1. A method in a computer system of decompressing data that has been subject to compression and the compressed data being in a set of predetermined data layers, the computer system including a host processor located on a first integrated circuit chip connected via a peripheral bus to a secondary processor located on a second integrated circuit ship, the method comprising the steps of:

decompressing at least a system layer, which is a higher level layer than a video layer, of the compressed data in the host processor; and decompressing other data layers of the set of predetermined layers, including decompressing the video layer, in the secondary processor.

2. The method of claim 1, wherein the secondary processor is a graphics accelerator.

3. The method of claim 1, wherein the secondary processor is a dedicated MPEG decompression circuit for decompression of data subject to MPEG compression and the host processor is a general purpose microprocessor.

4. The method of claim 1, wherein the step of decompressing at least a system layer further comprises decompressing a book layer of the set.

5. The method of claim 1, wherein the data includes audio and video data.

6. The method of claim 1, wherein the step of decompressing other data layers includes the steps of:

variable length decoding the compressed data;
inverse zig-zagging the decoded data;
inverse quantizing the zig-zagged data, and inverse discrete cosine transforming the inverse quantized data.

7. The method of claim 1, wherein the step of decompressing other data layers includes motion vector compensation of the data.

8. A system adapted for decompression of compressed data which is in a set of predetermined data layers, comprising:

a host processor located on a integrated circuit chip;
a peripheral bus connected to the host processor;
a secondary processor located on a second integrated circuit chip and connected to the peripheral bus; and
means for decompressing in the host processor at least a system layer, which is a higher level layer than a video layer, of the compressed data, wherein other data layers of the set of predetermined layers including the video layer are decompressed in the secondary processor.

9. The system of claim 8, wherein the secondary processor is a graphics accelerator.

10. The system of claim 8, wherein the secondary processor is a dedicated decompression circuit for decompression of data which has been compressed using MPEG compression and the host processor is a general purpose microprocessor.

11. The system of claim 8, wherein the means for decompressing at least a system layer further comprises decompressing means for decompressing a book layer of the set.

12. The system of claim 8, wherein the data includes audio and video data.

13. The system of claim 8, wherein the means for decompressing at least the system layer includes:

means for variable length decoding the compressed data;
means for inverse zig-zagging the decoded data; and
means for inverse quantizing the data.

14. The system of claim 8, wherein decompression of the other layers of the set includes motion vector compensation of the data.

15. The computer system of claim 8, further comprising a frame buffer connected to the secondary processor.

16. A frame reconstruction circuit for reconstructing a block of video data that has been subject to MPEG compression, the block of video data including a plurality of pixels arranged in a horizontal and vertical array, and comprising:

a first interpolation element having an input terminal for receiving data representing the pixels of the block of video data, wherein the first interpolation element averages data representing a first pixel of the block of data with data representing a second pixel adjacent in a first direction in the block of data to the first pixel, and providing the averaged value at an output terminal;

a second interpolation element having an input terminal coupled to the output terminal of the first interpolation element, wherein the second interpolation element averages an averaged value from the first interpolation element with an averaged value from the first interpolation element associated with a set of pixels of the block of data adjacent in a second direction orthogonal to the first direction, the second interpolation element having an output terminal for providing the average of the two averaged values at the output terminal; and a selector element having an input terminal coupled to the output terminal of the second interpolation element, wherein the selector element selectably provides at its output terminal a value representing one of:

a) an externally provided signal;
b) the average of the two averaged values from the second interpolation element;
c) a sum of the externally provided signal and the average of the two averaged values.

17. The circuit of claim 16, further comprising a first storage element coupled between the output terminal of the first interpolation element and the input terminal of the second interpolation element, and a second storage element coupled between the output terminal of the second interpolation element and the input terminal of the selector element.

18. The circuit of claim 16, wherein the first interpolation element includes:

a flip-flop having an input terminal and an output terminal, the flip-flop input terminal being coupled to the input terminal of the first interpolation element;

a multiplexer having a control terminal, first and second input terminals, and an output terminal, the input terminals of the multiplexer being coupled respectively to the input terminal of the first interpolation element and to the output terminal of the flip-flop; and an adder having two input terminals coupled respectively to the output terminal of the multiplexer and the output terminal of the flip-flop, and having an output terminal coupled to the output terminal of the first interpolation element.

19. The circuit of claim 16, wherein the second interpolation element includes:

a shift register having an input terminal coupled to the input terminal of the second interpolation element and having an output terminal;

a multiplexer having two input terminals coupled respectively to the output terminal of the shift register and the input terminal of the second interpolation element, a control terminal, and an output terminal; and an adder having two input terminals coupled respectively to the output terminal of the shift register and to the output terminal of the multiplexer, and having an output terminal coupled to the output terminal of the second interpolation element.

20. The circuit of claim 19, wherein the shift register includes:

an n stage shift register element, where n≧8;

a one-stage shift register element; and a multiplexer having two input terminals connected respectively to an output terminal of the n stage shift register element and to an output terminal of the one-stage shift register element.

21. The circuit of claim 16, wherein the selector element includes:

a first multiplexer having two input terminals connected respectively to the output terminal of the second interpolation element and to a reference value;, and having an output terminal and a control terminal;

a second multiplexer having two input terminals connected respectively to receive the externally provided signal and a reference value, and having an output terminal and a control terminal; and an adder having two input terminals coupled respectively to the output terminals of the first and second multiplexers, and having an output terminal coupled to the output terminal of the selector element.

22. The circuit of claim 16, wherein the input terminal of the first interpolation element and the output terminal of the selector element are each 8-bit parallel data ports, and the circuit has at least an internal bus structure of at least 8 bits.

23. The circuit of claim 16, further comprising a second data path for bidirectional processing, comprising:

an additional first interpolation element; and an additional second interpolation element;

wherein each of the additional interpolation elements are serially coupled in parallel to the first and second interpolation elements.

24. The circuit of claim 16, further comprising a feedback path coupling the output terminal of the selector element to the input terminal of the first interpolation element.

25. The circuit of claim 16, wherein one of the first and second interpolation elements is a horizontal interpolation element, another being a vertical interpolation element.

26. A method of reconstructing a block of video data that has been subject to MPEG compression, the block including a plurality of pixels arranged horizontally and vertically in an array, the method comprising:

first, selectively averaging values associated with two pixels adjacent in a first direction in the block;

second, selectively averaging two of the selectively averaged values associated with two sets of pixels adjacent in a second direction orthogonal in the first direction; and selectively providing as an output signal one of:

a) an externally provided signal;

b) a result of the second step of selectively averaging; and c) a sum of the externally provided signal and the result of the second step of selectively averaging.

* * * * *